June 11, 1968 L. F. WIRTH, JR 3,388,059
ACID WATER TREATING PROCESS
Filed Aug. 28, 1967
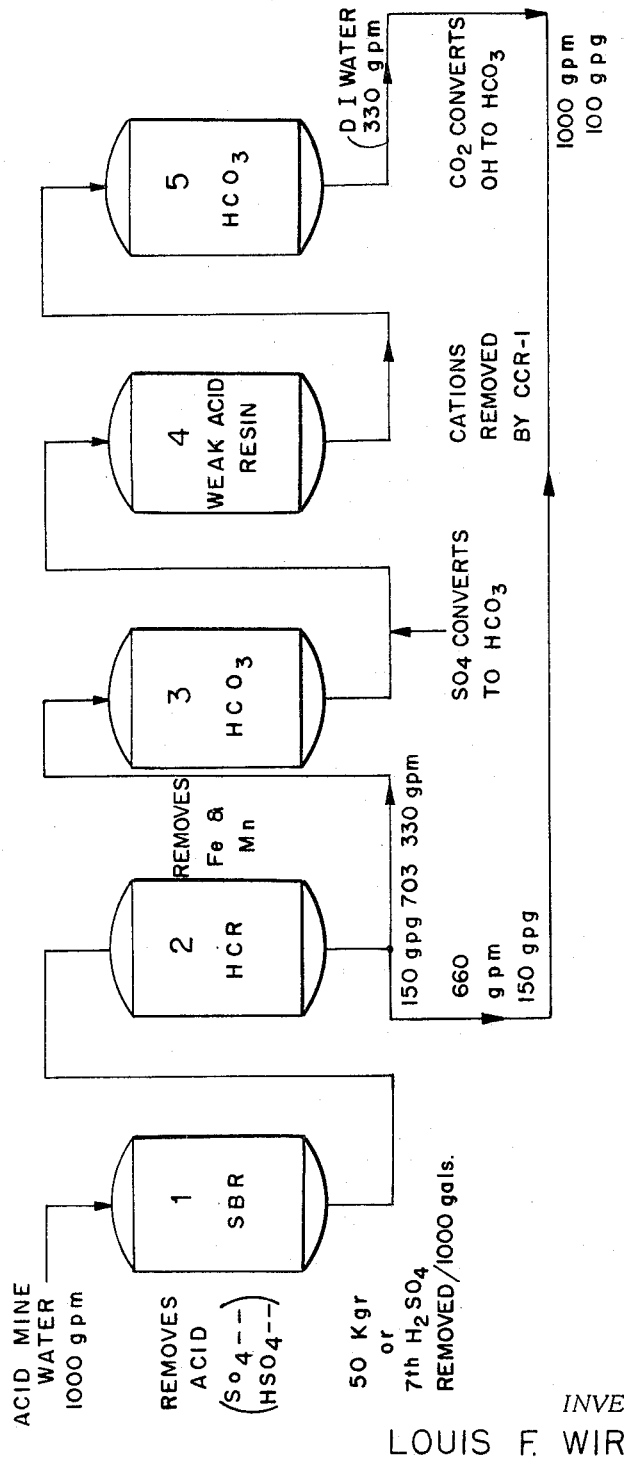
INVENTOR:
LOUIS F. WIRTH, JR.
BY
Marzall, Johnston, Cook & Root
ATT'YS United States Patent Office 3,388,059
Patented June 11, 1968

3,388,059
ACID WATER TREATING PROCESS
Louis F. Wirth, Jr., Western Springs, Ill., assignor to Nalco Chemical Company, Chicago, Ill., a corporation of Delaware
Filed Aug. 28, 1967, Ser. No. 663,769
2 Claims. (Cl. 210—32)

ABSTRACT OF THE DISCLOSURE

A method for purifying acidic waters and for efficiently converting the said waters into water of high quality. In the process, acidic waters such as acid mine waters are passed through a strong base anion exchange resin in the sulfate form to remove acid. The waters are then passed through a cation resin having on its exchange sites calcium ions which are exchanged for the iron and manganese ions in the waters. The waters which are now neutral are passed through a third column which contains a weakly basic anion exchange resin operated in the bicarbonate form where all sulfates, chlorides, and nitrates in the waters are converted to bicarbonate. The waters are then passed through a fourth column which is a weak acid cation exchange resin in the carboxylic acid form where hydrogen is exchanged for the cations that are present. Finally, the waters are passed through a fifth column which contains a weakly basic resin in the free base form where carbon dioxide is removed. In the process the acid which is originally present in the acid mine waters is sorbed in column 1 and when discharged is used to regenerate column number 4. This is the only source of acid required in the process. Column number 2 is regenerated with a calcium salt such as calcium chloride.

---

When coal deposits are exposed to natural weathering and erosions, the iron sulfides contained in the coal and adjacent strata oxidize to form new compounds, primarily ferrous sulfate and free sulfuric acid. The ferrous sulfate is then oxidized to ferric sulfate by means of oxygen in the atmosphere. In an excess of water, the ferric sulfate hydrolyzes to insoluble iron hydrates known as "yellow boy" and sulfuric acid. The above is accelerated by removal of the coal bed through mining whereby large surface areas are exposed to oxidation. Mining may also drain ground water from the surrounding strata and this seepage will dissolve the acid salts formed in the mine and transport them to the streams. The acid mine drainage problem is particularly present where there is extensive coal mining, an abundance of rainfall which produces large quantities of rain water and run-off, a low natural alkalinity of streams and presence of pyrite in coal.

With more specific regard to this problem, coal associated with iron disulfide usually is isolated from oxygen and water from its natural environment in the earth. However, mining the coal seam removes support from the overlying strata, inducing cave-in. Water and air influx together with exposure of traditional acid-producing materials, co-act to produce the acidic waste waters. The problem is particularly severe when mining activity is ceased. In these abandoned mines, water continues to flow indefinitely. For example, in one small abandoned underground mine, it was found, via random sampling, that the total acid load, in terms of the mine discharge over a period of 182 days, was equal to 41 tons of sulfuric acid. The acid load for the entire year would equal approximately 80 tons, which acidity flowed directly into a major river.

The reactions which occur in formation of acid mine waters are not exactly known. However, the following reactions have been generally accepted as typical of the chemical change occurring in the coal seam itself and surrounding rock strata in presence of air and water.

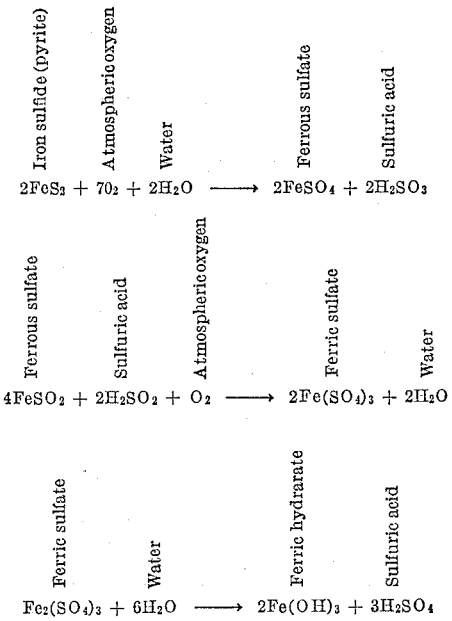

Additional ions such as silica, aluminum, manganese, calcium and magnesium are also present in a typical acid mine water, and these ions are thought to accelerate formation of acid. The above reactions generally occur when ground water percolates downwardly through the overburden of the mine, passes through the mining workings and then drains into streams or rivers.

As is readily apparent, the acid mine drainage creates a severe pollution problem and particularly causes extensive fish kill. The drainage from mine sites usually reaches the larger rivers via small tributaries. In many states acidic mine drainage waters have been classified as an industrial waste and disposal of such waters into streams whether clean or polluted has been prohibited. Millions of gallons of mine water containing sulfuric acid, ferrous sulfate and ferrous hydroxide are discharged annually into bodies of water in varying amounts of acidity up to about 5,000 p.p.m. It is therefore evident that the problem is one of some magnitude.

A number of proposals have been made in an effort to overcome this problem. For example, it has been advocated that sufficient coal be permitted to remain in place to prevent cave-in. However, this causes a severe economic loss due to the coal left behind. In many coal seams, systematic pulling of pillars and controlled caving yield the only practical method of relieving excessive rock pressures. Such excavations, of course, materially increase production costs.

Another proposal that has been made involves sealing off abandoned mines to exclude air and to prevent oxidation of sulfide material. However, the high infiltration rate and permeability of the overburden to water has made this suggestion a poor solution to the problem at hand.

In my copending application Ser. No. 569,840 a process is disclosed whereby the iron and acidity in the acid mine discharge waters are removed. This process makes it possible to purify such discharge waters prior to drainage into rivers and other bodies of water. In the process, waters containing iron and sulfuric acid impurities are brought into contact with an anion exchange resin in the sulfate form which reduces the sulfuric acid content. The waters are then contacted with a cation resin having on its exchange sites cations selected from ammonia, calcium, magnesium, sodium and potassium which are capable of being replaced by iron or manganese ions whereby the iron or manganese content in the waters is reduced.

While this process is highly advantageous the treated waters have a high dissolved mineral content and are hard. A need is present to not only eliminate iron and acids from waters such as acid mine waters but also to raise the quality of such waters by eliminating hardness and excessive dissolved solids.

It is an object of the present invention, therefore, to provide an improved process for treating acid mine waters and other acid bearing effluents. A more specific object of the invention is to provide a process for purifying acidic mine discharge waters and other acid bearing effluents by removing iron and sulfuric acid impurities while at the same time and in an integrated process converting said waters into waters of low hardness and having a low dissolved solids content.

Another object of the invention is to provide an economical process for treating acidic waters in which acid removed from the waters is used to regenerate a cation exchange bed used in the process.

Other objects will become apparent to those skilled in the art from the following detailed description of the invention.

In general, the invention comprises the discovery of a process utilizing four-five ion exchange beds which process can be carried out economically and efficiently to produce high quality water from acid mine discharge waters and the like. In the process, the entire amount of water to be treated is passed through the first two ion exchange beds while in most instances only a portion of the water is treated in the subsequent three beds. In bed number one an anion exchange resin in the sulfate form is used to remove acid from the waters. In bed two the iron and manganese contained in the water are removed using a cation exchange resin preferably operated on a calcium cycle. The effluent from column or bed two is neutral and is relatively free of iron and manganese. The bulk of the water from column two flows to column three which is a weakly basic anion exchange resin operated in the bicarbonate form. In column three all sulfates, chlorides, and nitrates are converted to bicarbonate. The effluent from bed three passes to bed four which consists of a weak acid exchange resin. In bed four hydrogen is exchanged for the cations that are present in the water. This is a highly efficient exchange. The effluent from bed four contains a large quantity of carbon dioxide which is removed by the fifth column. The fifth column contains a weakly basic resin in the free base form. In lieu of the fifth column, a vacuum deaerator may be used to recover the $CO_2$ which is fed back to column three for continual carbonation of the ammonia regenerated column. It is contemplated that the demineralized water flowing from column five may be used separately or can be blended with effluent from the first two columns.

As will be described below in more detail, column one contains an anion exchange resin in the sulfate form. This resin can be regenerated with water preferably containing some alkalinity. The acid regeneration effluent from the ion exchange resin is passed through the weak acid cation exchange resin (bed four) for regeneration of that resin. Thus, the acid removed from the acid mine water is used (as a source of hydrogen ions) to regenerate bed four. This is the only source of acid that need be used in the present process. The weak base resin (bed three) is regenerated with ammonia to convert the resin to the free base form. Carbon dioxide produced in the process is used for the carbonation of this resin prior to its re-insertion in the number three location. To make the process even more economical, ammonia is recovered by liming the effluent and by again using the effluent for the weak base regeneration. A source of carbon dioxide is required to make up losses which are inherent in the process.

The invention can best be seen by reference to the attached diagrammatic sketch which illustrates the flow of water and regeneration agents through the five-bed system.

As is apparent from the drawing, acid mine waters pass through bed one which is an anion exchange resin operating on a sulfate-bisulfate cycle. Acid-free water leaving bed one passes through bed two which contains a cation exchange resin operated on a calcium cycle. The calcium ions of the resin are exchanged for ion and manganese ions.

As is shown in the drawing, it is possible to combine a portion of the water from bed two directly with the water leaving bed five. The balance of the water from bed two passes to the weak base resin contained in bed three. This resin operates on a bicarbonate cycle where sulfates, chloride, and nitrates are converted to bicarbonate. The bicarbonate-containing water is then passed to bed four which contains a weak acid resin. In column four the resin exchanges hydrogen for the cations that are present in the water. The effluent from bed four which now contains a large amount of carbon dioxide is passed through the fifth column. The weakly basic resin in the free base form present in bed five removes the carbon dioxide. The demineralized water from bed five can be used separately or can be blended with the effluent from column or bed two.

As was indicated previously, an important feature of the invention lies in the fact that regenerant effluent from bed one is passed through bed four to regenerate the weak acid resin. Bed three is regenerated with $NH_4OH$ when the bed is in the position of bed five. The carbon dioxide in effluent of bed four is removed by bed five and when bed five is converted to the bicarbonate form it is rotated again to position three.

Preferred anion exchange resins used in the practice of the invention for bed one are strongly basic anion exchange resins, i.e. anion exchange resins which in the hydroxide form are capable of converting inorganic salts in aqueous solution directly to hydroxides. Thus, a strongly basic anion exchange resin is capable of converting an aqueous solution of sodium chloride directly to an aqueous solution of sodium hydroxide. A strongly basic anion exchange resin can also be defined as one which on titration with hydrochloric acid in water free from electrolytes has a pH above 7.0 when the amount of hydrochloric acid added is one-half of that required to reach the inflection point (equivalence point). A weakly basic anion exchange resin under the same conditions has a pH below 7.0 when one-half of the acid required to reach the equivalence point has been added. The strongly basic anion exchange resins which are available commercially are characterized by the fact that the exchangeable anion is a part of a quaternary ammonium group. The quaternary ammonium group has the general structure:

wherein $R_1$, $R_2$ and $R_3$ represent alkyl or substituted alkyl groups, and $X^-$ is a monovalent anion.

Examples of the strongly basic anion exchange resins which can be employed in the practice of the invention are those resins disclosed in U.S. Patents 2,591,573, 2,597,440, 2,597,494, 2,614,099, 2,630,427, 2,632,000 and 2,632,001.

Strongly basic insoluble anion exchange resins include reaction products of a tertiary alkyl amine and a vinyl aromatic resin having halo methyl groups attached to aromatic nuclei in the resin which resins are subsequently converted to the sulfite form. Another class of strongly basic anion exchange resins suitable for the practice of the invention are the reaction products of tertiary carbocyclic or heterocyclic amines and vinyl aromatic resins having halo methyl groups attached to aromatic nuclei in the resin which resins are subsequently converted to the sulfite form.

The vinyl aromatic resins employed as starting materials in making the anion exchange resins employed in the preferred practice of the invention are the normally solid benzene-insoluble copolymers of a monovinyl aromatic compound and a polyvinyl aromatic compound containing from 0.5 to 40% by weight, preferably from 0.5 to 20% by weight of the polyvinyl aromatic compound, chemically combined with 99.5% to 60% by weight of the monovinyl aromatic compound. Examples of suitable monovinyl aromatic compounds are styrene, alpha methyl styrene, chlorostyrenes, vinyl toluene, vinyl naphthalene, and homologues thereof, capable of polymerizing as disclosed, for example, in U.S. Patent 2,614,099. Examples of suitable polyvinyl aromatic compounds are divinyl benzene, divinyl toluene, divinyl xylene, divinyl naphthalene and divinyl ethyl benzene. These resins are halo methylated as described, for instance, in U.S. patent 2,614,099, preferably to introduce an average of 0.2 to 1.5 halo methyl groups per aromatic nucleus in the copolymer and then reacted with a tertiary amine to introduce a quaternary ammonium anion exchange group. Examples of suitable tertiary amines are trimethyl amine, triethyl amine, tributyl amine, dimethyl propanol amine, dimethyl ethanol amine, methyl diethanolamine, 1-methyl-amino-2,3-propane diol, dioctyl ethanolamine, and homologues thereof.

The anion exchange resins can also be prepared by halogenating the molecule of the resin and then introducing an anion exchange group as described in U.S. Patent 2,632,000 and subsequently converting them to the sulfite form, with or without admixture with the hydroxide form of the resin.

Specific anion exchange resins that can be used as starting materials in practicing the invention include Dowex SAR and Dowex SBR. Dowex SBR is a styrene-divinylbenzene resin containing quaternary amine ion exchange groups in which the three R groups are methyl groups. This resin consists of spherical particles of 20 to 50 mesh and containing about 45% water. The total exchange capacity is approximately 1.2 equivalents per liter, wet volume. Dowex SAR is similar to Dowex SBR except that one of the methyl groups in the quaternary amine salt structure is replaced by a hydroxy ethyl group. Dowex SBR is somewhat more basic than Dowex SAR.

From a regeneration or conversion standpoint, the $$HSO_3^- \rightleftarrows SO_3^-$$

reaction is independent of the anion resin used. For this reason both strong base anion exchange resins and weak base anion exchange resins are contemplated within the scope of this invention. The commercially available products Dowex WGR and Dowex WBR are examples of polyamine-type weak base resins. Such resins usually contain a mixture of primary, secondary, and tertiary amine groups.

The cation exchange resins (bed 2) themselves are known in the prior art. One of the most common types is a sulfonated resin. Dowex HCR-W is a typical resin of this type, and is a sulfonated styrene divinyl benzene strongly acid cation exchanger of the type described in U.S. 2,366,007. Thus, all that is necessary in order to utilize this resin is to put it in a calcium or other suitable form.

Another suitable form of cation exchange resin is a sulfonate acid phenol-formaldehyde resin, such as a resin derived by condensing a phenolsulfonic acid with formaldehyde. In general, resins having a plurality of sulfonic acid groups are the most suitable cation exchange resins suitable for this invention. Synthetic zeolites may also be used in this step.

Bed number three is a weakly basic anion resin in the bicarbonate form. This resin operates to convert sulfates, chlorides, and nitrates to bicarbonate in the following manner:

$$R-NH \cdot HCO_3 + NaCl \rightarrow R-NH \cdot Cl + NaHCO_3$$

Bed number four is a weak acid cation exchange resin in the carboxylic acid form. In this resin hydrogen is exchanged for the cations that are present in accordance with the following equation:

$$R-COOH + NaHCO_3 \rightarrow R-COONa + H_2O + CO_2$$

Bed number five contains a weakly basic resin in the free base form. In this resin carbon dioxide is removed by the following carbonation reaction:

$$R-N + CO_2 + H_2O \rightarrow R-NH-HCO_3$$

After a certain period of use, the anion resin of bed one becomes exhausted and regeneration is necessary. Any method of conventional regeneration of anion resins may be utilized, as long as the bisulfate form of the exhausted resin is converted to the useful sulfate form. One preferred method is to rinse the exhausted anion bed with water. The water can be flowed either downwardly or upwardly through the anion exchange resin. In a particularly preferred embodiment, the purified acid mine water is utilized as an anion exchanger regenerant, thus making the overall process more attractive economically.

The conversion of anion exchange resin bisulfate to the sulfate form can be accelerated by using an alkaline rinse water, whether the source of water be the purified acid mine water or another source of rinse water. A greatly preferred alkaline compound used as the make-up for the alkaline rinse water is lime, preferably in slurry form. Other alkaline compounds may also be used such as, for example, ammonium hydroxide, sodium bicarbonate, sodium hydroxide, potassium bicarbonate and potassium hydroxide. The use of an alkaline compound accelerates the regeneration step, although untreated water may also be usefully employed.

The regenerant used for the cation exchange resin may be a source of neutral water. To this is added calcium chloride, and this calcium chloride solution is also flowed upward or downward through the exhausted cation resin. The regeneration effluent is again added back to the reactor containing regenerant solution. To replenish the source of calcium, lime is added to the cation regenerant solution. This causes the iron now present to precipitate as an iron hydroxide. Generally, a source of oxygen is also added to this regenerant solution in order to convert the iron from ferrous to ferric form, thereby causing precipitation of the iron. The ferric hydroxide may then be used as a suitable source of iron in a steel making operation.

Obviously many modifications and variations of the invention as hereinbefore set forth may be made without departing from the spirit and scope thereof, and therefore only such limitations should be imposed as are indicated in the appended claims.

I claim:

1. A process for purifying acidic waters which comprises: bringing said water into contact with a strong base anion exchange resin in the sulfate form (bed 1) to remove acids, passing the effluent from bed 1 through a cation resin having calcium ions at its exchange sites (bed 2), wherein iron and manganese ions in said water are exchanged for said calcium ions, passing at least a portion of the effluent from bed 2 through a weakly basic anion exchange resin operated in the bicarbonate form (bed 3) wherein all sulfates, chlorides and nitrates in said water are converted to bicarbonate, passing the effluent from bed 3 through a weak acid exchange resin (bed 4) wherein hydrogen is exchanged for the cations that are present in the water, and passing the effluent from bed 4 through a weakly basic resin in the free base form (bed 5) wherein carbon dioxide contained in said water is removed.

2. In the purification process of claim 1 the improvement which comprises: regenerating bed one by passing water through said bed to remove acid, and thereafter regenerating the weak acid cation exchange resin of bed four by passing the regenerant effluent from bed one through said bed four.

References Cited

UNITED STATES PATENTS

| | | | |
|---|---|---|---|
| 2,628,165 | 2/1953 | Bliss | 210—38 X |
| 2,660,558 | 11/1953 | Juda | 210—32 X |
| 2,738,322 | 3/1956 | Bauman et al. | 210—32 |
| 3,147,215 | 9/1964 | Blight | 210—38 X |

SAMIH N. ZAHARNA, *Primary Examiner.*

UNITED STATES PATENT OFFICE
CERTIFICATE OF CORRECTION

Patent No. 3,388,059 June 11, 1968

Louis F. Wirth, Jr.

It is certified that error appears in the above identified patent and that said Letters Patent are hereby corrected as shown below:

Column 2, line 10, "$2H_2SO_3$" should read -- $2H_2SO_4$ --; Column 2°, "$2H_2SO_2$" should read -- $2H_2SO_4$ --; lines 22 to 28, "Ferric hydrarate" should read -- Ferric hydrate --.

Signed and sealed this 16th day of December 1969.

(SEAL)
Attest:

Edward M. Fletcher, Jr.
Attesting Officer

WILLIAM E. SCHUYLER, JR.
Commissioner of Patents